United States Patent
Beckner et al.

(10) Patent No.: US 10,677,517 B1
(45) Date of Patent: Jun. 9, 2020

(54) CROSS MEMBER FOR AN INSULATED STRUCTURE

(71) Applicant: WHIRLPOOL CORPORATION, Benton Harbor, MI (US)

(72) Inventors: Jeffrey Beckner, Niles, MI (US); Aaron Michael Stewart, Buchanan, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/455,882

(22) Filed: Jun. 28, 2019

(51) Int. Cl.
*F25D 23/06* (2006.01)
*F24C 15/34* (2006.01)
*F16L 59/065* (2006.01)

(52) U.S. Cl.
CPC .......... *F25D 23/063* (2013.01); *F16L 59/065* (2013.01); *F24C 15/34* (2013.01); *F25D 2201/14* (2013.01)

(58) Field of Classification Search
CPC ..... F25D 23/062; F25D 23/063; F16L 59/065
See application file for complete search history.

(56) References Cited

U.S. PATENT DOCUMENTS

| | | | | |
|---|---|---|---|---|
| 2,939,811 A | * | 6/1960 | Dillon | E04C 2/246 312/406 |
| 5,908,229 A | * | 6/1999 | Wetherholt | A47B 47/02 312/263 |
| 6,038,830 A | * | 3/2000 | Hirath | F16L 59/065 428/69 |
| 6,257,684 B1 | | 7/2001 | Hirath et al. | |
| 6,393,798 B1 | * | 5/2002 | Hirath | F16L 59/065 312/400 |
| 6,408,841 B1 | | 6/2002 | Hirath et al. | |
| 6,725,624 B2 | | 4/2004 | Hirath et al. | |
| 9,861,212 B1 | * | 1/2018 | Muth | E05B 65/0042 |
| 2017/0059229 A1 | * | 3/2017 | Seo | F25D 23/063 |
| 2017/0321956 A1 | | 11/2017 | Hiemeyer et al. | |

* cited by examiner

*Primary Examiner* — Daniel J Rohrhoff
(74) *Attorney, Agent, or Firm* — Price Heneveld LLP (57) ABSTRACT

A panel assembly for a vacuum insulated structure includes a first panel having inner and outer surfaces and a second panel having inner and outer surfaces. The outer surface of the second panel is partially disposed on the inner surface of the first panel to define a joint portion therebetween. A seam member operably couples the first panel to the second panel along the joint portion. At least one cross member intersects the seam member. The at least one cross member further operably couples the first panel to the second panel.

20 Claims, 8 Drawing Sheets

CROSS MEMBER FOR AN INSULATED STRUCTURE

BACKGROUND OF THE DISCLOSURE

The present disclosure generally relates to a vacuum insulated structure, and more specifically, to a cross member for a vacuum insulated structure.

SUMMARY OF THE DISCLOSURE

According to one aspect of the present disclosure, a panel assembly for a vacuum insulated structure includes a first panel having inner and outer surfaces and a second panel having inner and outer surfaces. The outer surface of the second panel is partially disposed on the inner surface of the first panel to define a joint portion therebetween. A seam member operably couples the first panel to the second panel along the joint portion. At least one cross member intersects the seam member and further operably couples the first panel to the second panel.

According to another aspect of the present disclosure, a panel assembly for an appliance includes a first panel having inner and outer surfaces and a second panel having inner and outer surfaces. The inner surface of the second panel is partially disposed on the outer surface of the first panel to define a joint portion therebetween. A seam member operably couples the first panel to the second panel. A plurality of cross members where each cross member of the plurality of cross members includes a first portion disposed on the first panel. Each cross member of the plurality of cross members also includes a second portion disposed on the second panel and an intermediate portion positioned between the first and second portions.

According to yet another aspect of the present disclosure, a method for forming a panel assembly for an appliance includes positioning a first panel having inner and outer surfaces proximate a second panel having inner and outer surfaces. The first and second panels are overlapped to define a joint portion therebetween. The first panel is coupled to the second panel using a seam member. A plurality of cross members intersect the seam member and interconnect the first and second panels.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of method steps and apparatus components related to a cross member for a vacuum insulated structure. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
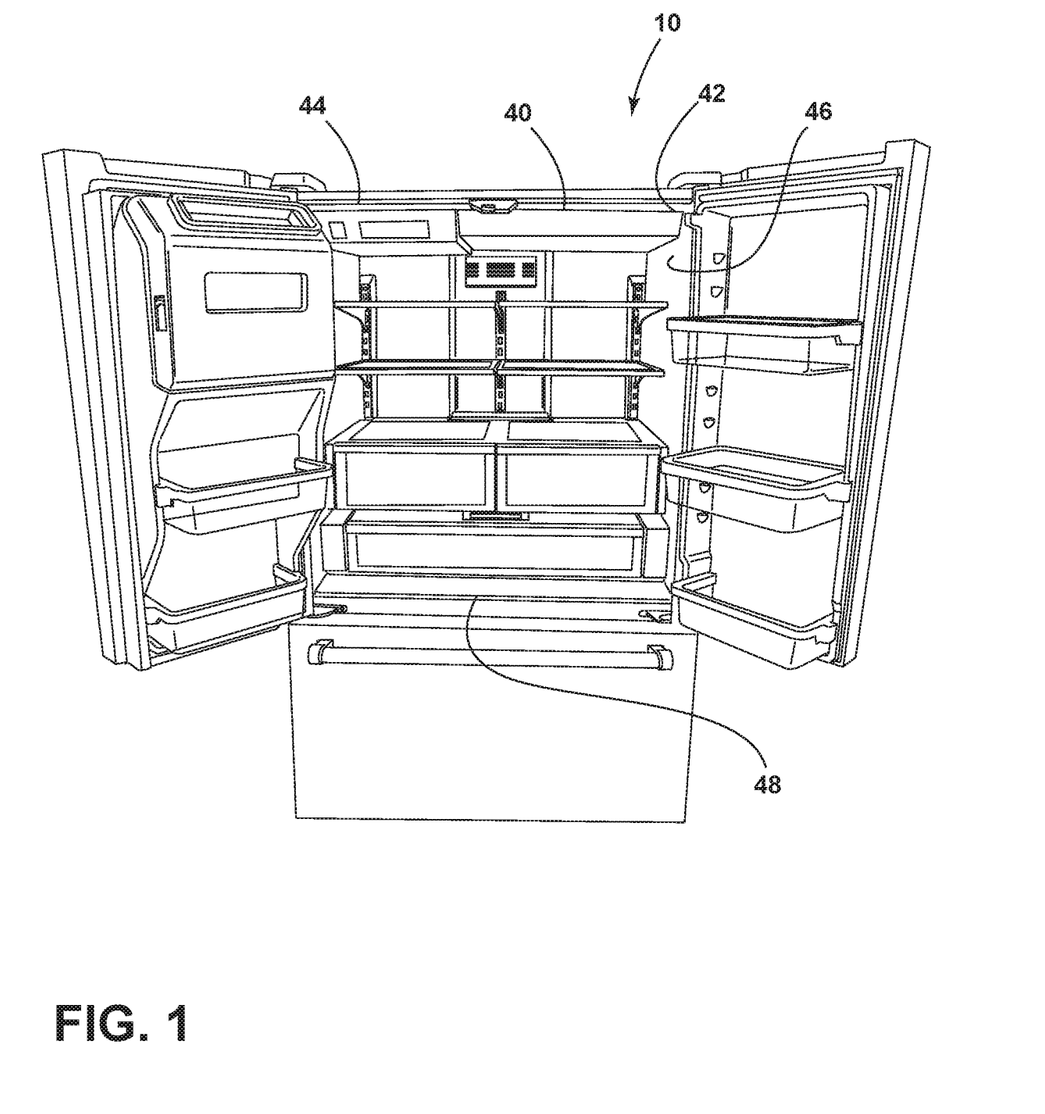
FIG. 1 is a front perspective view of an appliance of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

As used herein, the term "seam member" is a first weld defined between two substrates capable of being welded. The term "cross member," as used herein, is a second weld defined in relation to the seam member.

Referring to FIGS. 1-11, reference numeral 10 generally designates an appliance including a panel assembly 14. The panel assembly 14 includes a first panel 16a having inner and outer surfaces 18a, 18b, and a second panel 16b having inner and outer surfaces 19a, 19b. The outer surface 19b of the second panel 16b may be partially disposed on the inner surface 18a of the first panel 16a to define a joint portion 24 therebetween. A seam member 26 may operably couple the first panel 16a to the second panel 16b along the joint portion 24. Additionally, a plurality of cross members 28, where each cross member 28 includes a first portion 30 disposed on the first panel 16a and a second portion 32 disposed on the second panel 16b. Each cross member 28 may also include an intermediate portion 34 positioned between the first and second portions 30, 32.

Figure 6:
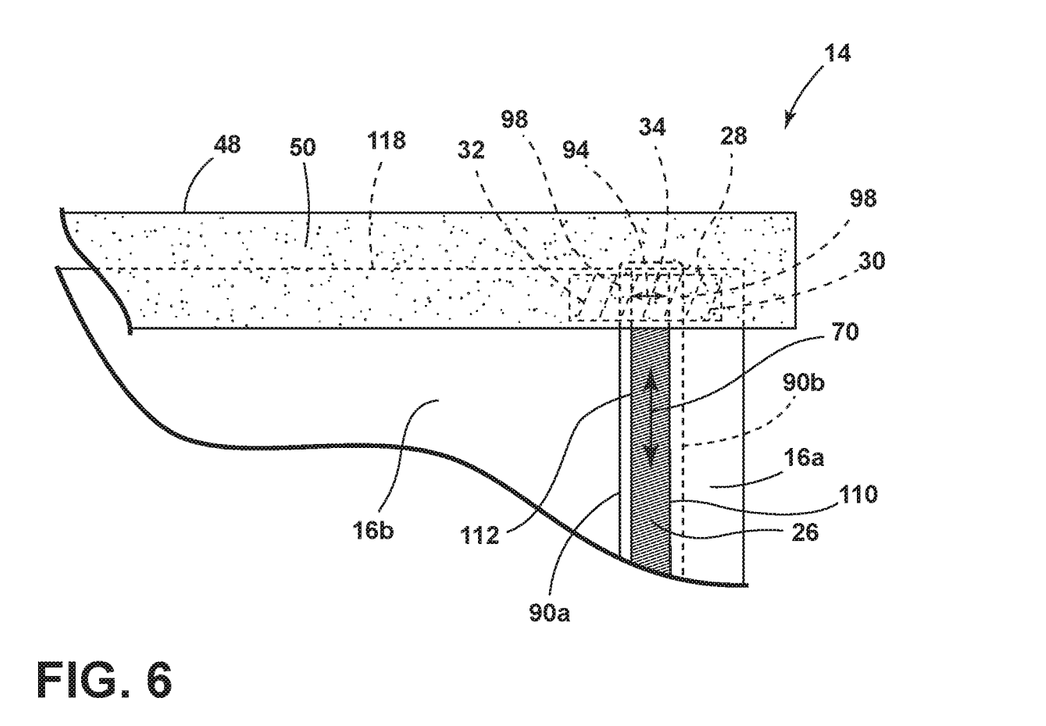
FIG. 6 is a partial top view of a corner of a panel assembly of the present disclosure.

Referring now to FIG. 1, the appliance 10 is illustrated in the form of a French-door refrigerator. Although illustrated as a refrigerator, it is also contemplated that the appliance 10 may be any appliance 10 that may utilize the panel assembly 14 (FIG. 2) as described herein. It is generally contemplated that the panel assembly 14 (FIG. 2) may form a vacuum insulated structure 40, which may be used as an insulation member for, as a non-limiting example, a body 42 of the appliance 10. Additionally, the body 42 of the appliance 10 may be further defined by a structural member, such as a wrapper 44 and/or a liner 46, which may be coupled to a trim breaker 48 with an adhesive 50 (FIG. 6).

Figure 2:
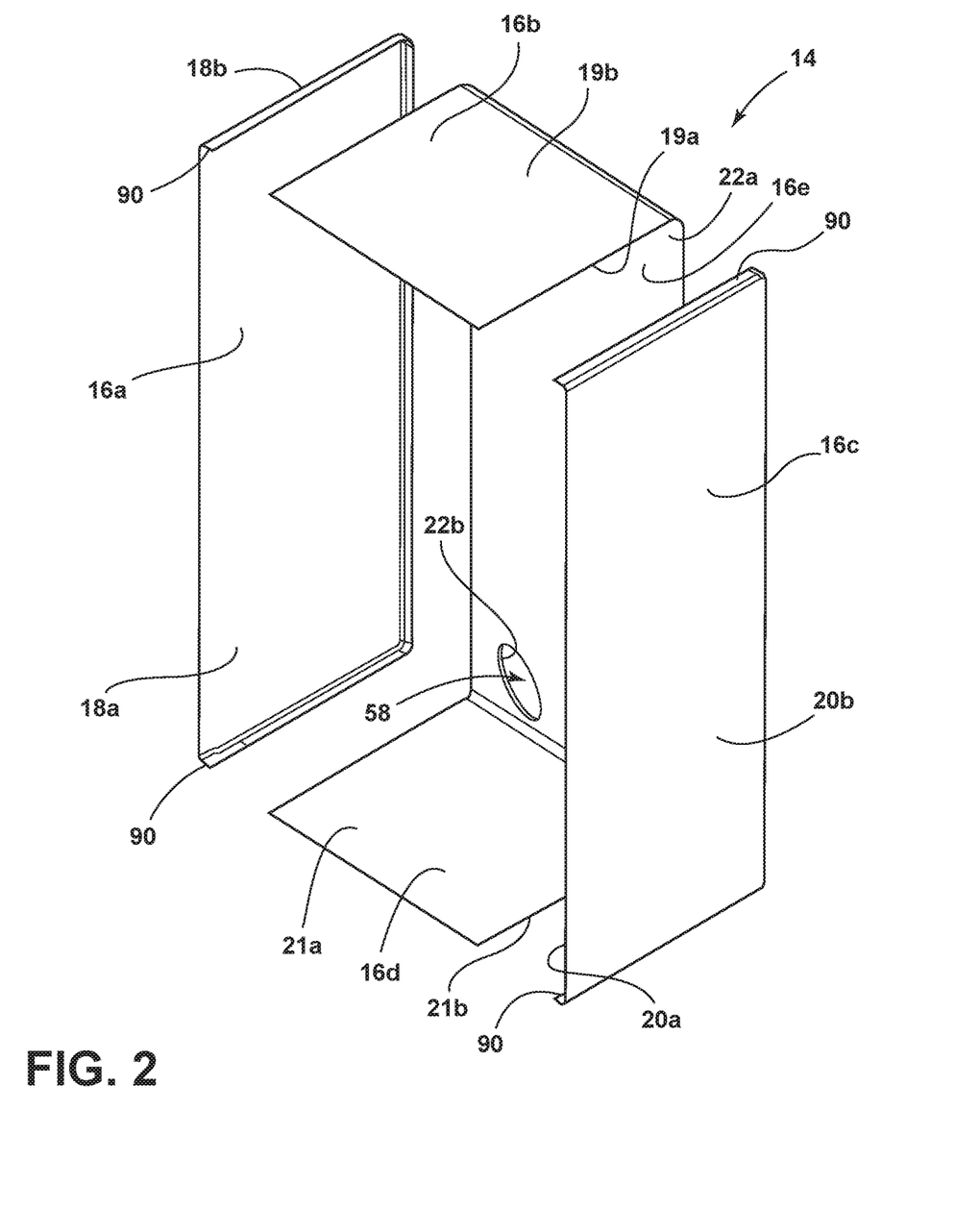
FIG. 2 is a top perspective exploded view of a panel assembly of the present disclosure.
Figure 3:
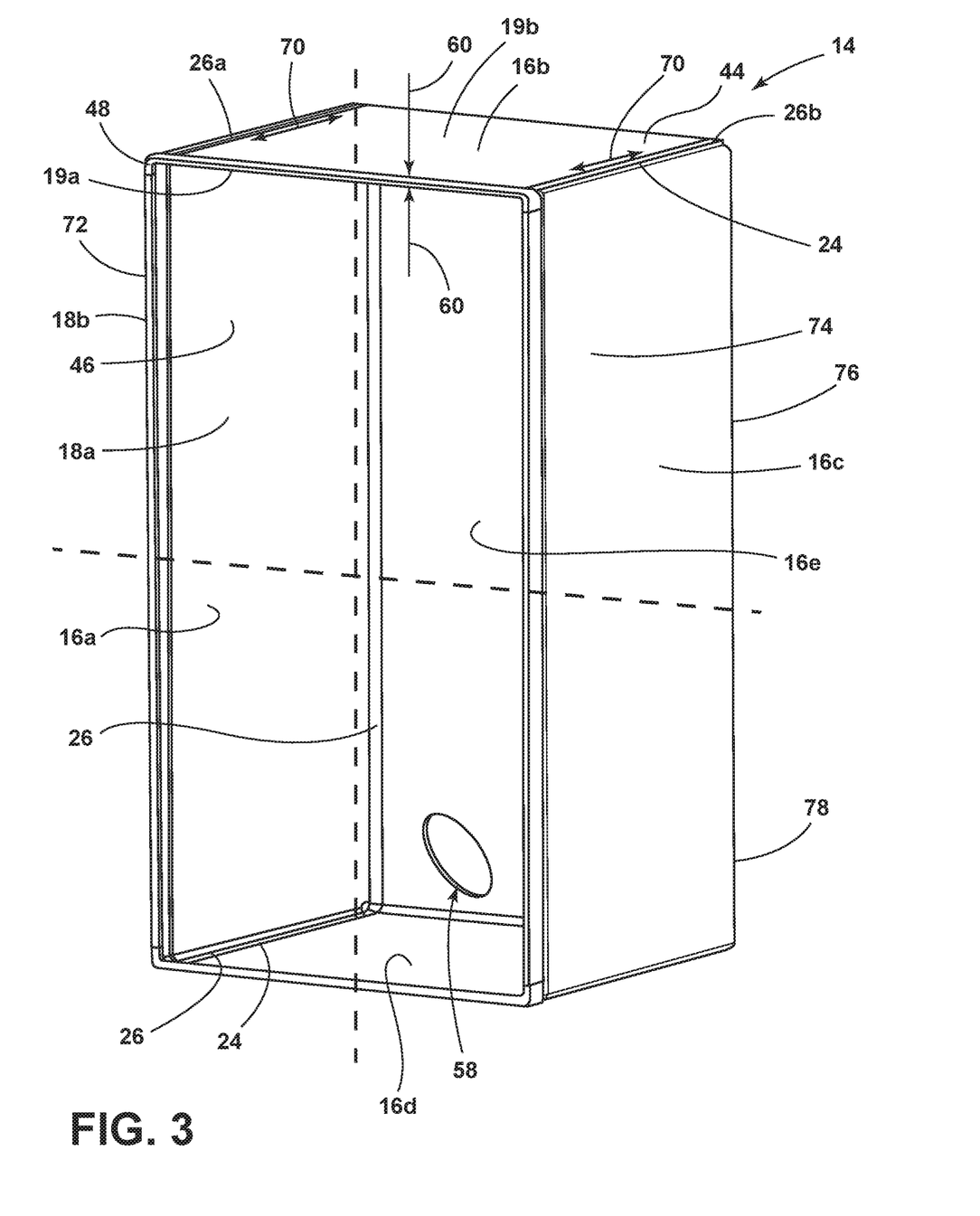
FIG. 3 is a front perspective view of a panel assembly of the present disclosure.

Referring now to FIG. 2 and according to various examples, a plurality of panels 16a-16e forms the panel assembly 14 and includes individual panels such as the first panel 16a, the second panel 16b, as well as a third panel 16c, a fourth panel 16d, and a rear panel 16e. Accordingly, the third and fourth panels 16c, 16d may be operably coupled with the first and second panels 16a, 16b to further define the panel assembly 14. Additionally, the rear panel 16e may be coupled to each of the first, second, third, and fourth panels 16a-16d to form the panel assembly 14. In addition, each of the plurality of panels 16a-16e includes an inner surface 18a, 19a, 20a, 21a, 22a and outer surface 18b, 19b, 20b, 21b, 22b and any adjacent pair of the inner and outer surfaces 18a-22b may overlap to further define the joint portion 24 (FIG. 3). For example, the second and third panels 16b, 16c may overlap to define the joint portion 24.

In a further example, the first and fourth panels 16a, 16d may overlap to define the joint portion 24 such that the outer surface 21b of the fourth panel 16d may be partially disposed on the inner surface 18a of the first panel 16a. The same may be true of the third and fourth panels 16c, 16d, in that the outer surface 21b of the fourth panel 16d may be partially disposed on the inner surface 20a of the third panel 16c. Although described above as the outer surface 20b of the second panel 16b overlapping the inner surface 18a of the first panel 16a, it is also contemplated that the inner surface 20a of the second panel 16b may overlap the outer surface 18b of the first panel 16a in defining the joint portion 24. Moreover, alternate combinations of the plurality of panels 16a-16e may overlap to define the joint portion 24. Other overlapping constructions of the plurality of panels 16a-16e may occur such that the inner and outer surfaces 18a-22b of any adjacent panels of the plurality of panels 16a-16e may overlap.

Additionally, the rear panel 16e may define an evacuation port 58 through which an at least partial vacuum may be drawn. Although depicted as being defined by the rear panel 16e, the evacuation port 58 may be defined by any one of the plurality of panels 16a-16e. As the plurality of panels 16a-16e may be a metallic material that resists deflecting, bowing, or other forms of compression, the plurality of panels 16a-16b generally resist an inward compressive force 60 (FIG. 3) created during evacuation through the evacuation port 58. For simplification throughout, the first and second panels 16a, 16b may be referred to for illustrative construction purposes; however, the same construction may apply to and may include the third and fourth panels 16c, 16d, as well as the rear panel 16e.

Referring now to FIG. 3, when forming the panel assembly 14, the seam member 26 may include a first seam member 26a and a second seam member 26b, where the first and second seam members 26a, 26b may each form a continuous seam. Each of the first and second seam members 26a, 26b may be disposed longitudinally, in a first direction 70, along the joint portion 24. In such construction, the first direction 70 is defined by each of the first and second seam members 26a, 26b being substantially parallel with the joint portion 24. Additionally, each of the first and second seam members 26a, 26b may be disposed along the joint portion 24 of each pair of the plurality of panels 16a-16e to form a seal. For example, the first seam member 26a may seal the joint portion 24 defined by the first and second panels 16a, 16b.

Moreover, each of the first and second seam members 26a, 26b may seal each of the joint portions 24 along a first half 72 and a second half 74 of the panel assembly 14. By way of example, not limitation, the first seam member 26a may seal, on the first half 72 of the panel assembly 14, the joint portions 24 defined by the first and second panels 16a, 16b, the first and rear panels 16a, 16e, and the first and fourth panels 16a, 16d, respectively. Additionally, on the second half 74 of the panel assembly 14, the second seam member 26b may seal the joint portions 24 defined by the second and third panels 16b, 16c, the third and rear panels 16c, 16e, and the third and fourth panels 16c, 16d, respectively. Alternatively, the seam member 26 may seal each of the joint portions 24 described above individually.

The panel assembly 14 may be further divided into a top half 76 and a bottom half 78. The top half 76 may include, for example, the second and rear panels 16b, 16e sealed by the seam member 26, and the bottom half 78 may include, for example, the fourth and rear panels 16d, 16e sealed by the seam member 26. In addition, the seam member 26, when applied, may couple the first and second panels 16a, 16b in such a manner that the seam member 26 may be disposed on both the inner and outer surfaces 18a, 18b of the first panel 16a and the inner and outer surfaces 19a, 19b of the second panel 16b simultaneously. In one example, the seam member 26 may be a seam weld such as a resistance seam weld. Additionally or alternatively, the seam member 26 may be formed from laser brazing, soldering, rectangular spot welding, and/or laser welding.

Figure 4:
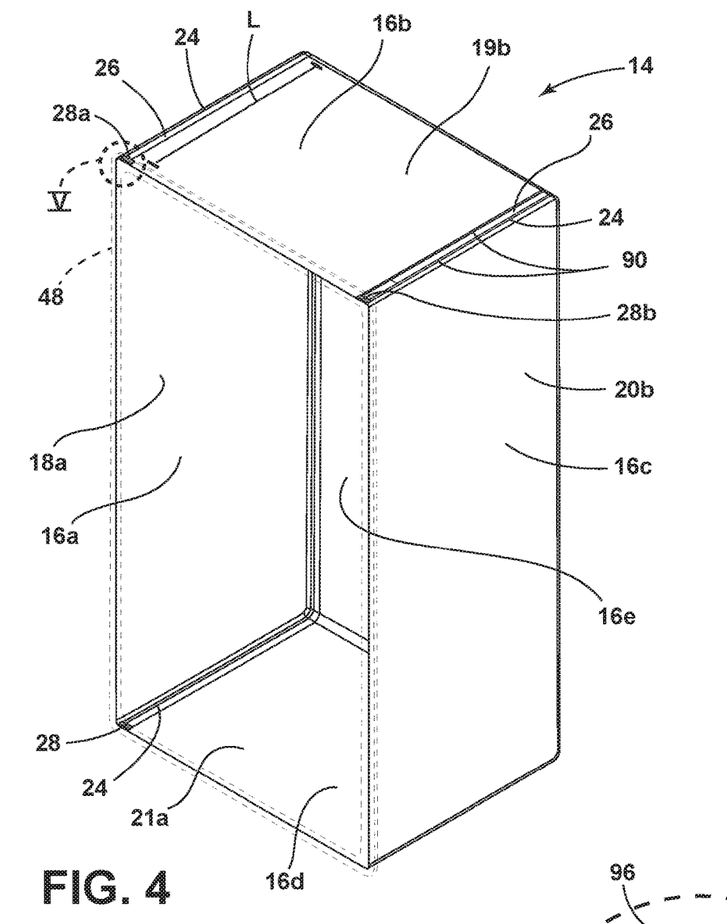
FIG. 4 is a top perspective view of a panel assembly of the present disclosure.
Figure 5:
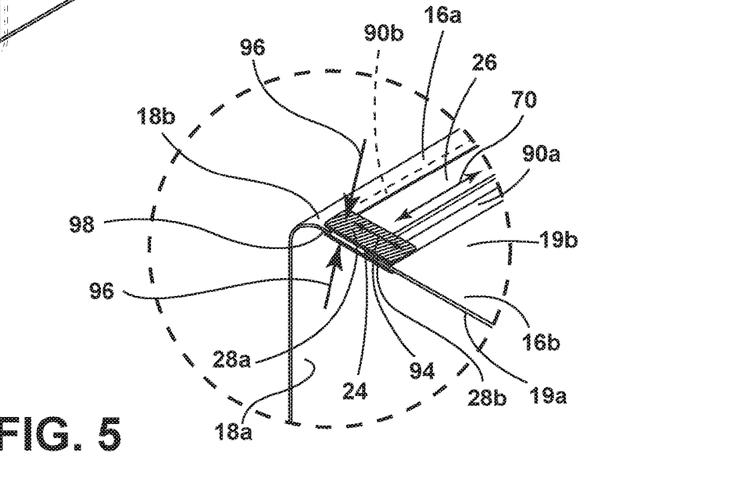
FIG. 5 is a partial top perspective view of a corner of the panel assembly of FIG. 4 of the present disclosure.

Referring now to FIGS. 4 and 5, brims 90 may be defined along a length L of the panel assembly 14 where the first and second panels 16a, 16b are sealed by the seam member 26. The brims 90 may be formed proximate the seam member 26 disposed along the joint portion 24 of the first and second panels 16a, 16b. Additionally, the brims 90 may include a first brim 90a and a second brim 90b, where the first brim 90a may be formed from the first panel 16a and the second brim 90b may be formed from the second panel 16b. For example, the first brim 90a may be positioned proximate to the outer surface 19b of the second panel 16b, and the second brim 90b may be positioned proximate the inner surface 18a of the first panel 16a. As stated above, after forming the panel assembly 14, the first and second panels 16a, 16b may be coupled to the trim breaker 48 by the adhesive 50 (FIG. 6). However, the adhesive 50 (FIG. 6) may minimally secure the brims 90 relative the first and second panels 16a, 16b. Accordingly, upon evacuation of the vacuum insulated structure 40 (FIG. 1), the inward compressive force 60 (FIG. 3) may generally cause the brims 90 to angle away from the seam member 26 and the joint portion 24, such that without the seam member 26 the first and second panels 16a, 16b would otherwise separate.

In the angled position, the brims 90 may define gaps between the inner and outer surfaces 18a, 18b of the first panel 16a and the inner and outer surfaces 19a, 19b of the second panel 16b. Without additional sealing, the gaps may form leak channels through which, over time, the at least partial vacuum may dissipate. To minimize the potential leak channels, the cross member 28 is disposed across the seam member 26 such that the cross member 28 intersects the seam member 26 in a second direction 94 relative the first direction 70 of the seam member 26. In one example, the cross member 28 may be a resistance seam weld such that a single cross member 28 couples the brims 90 of the first and second panels 16a, 16b, and the cross member 28 seals the gaps between the first and second panels 16a, 16b. Alternatively, and described throughout, a plurality of cross members 28 may be used to seal the potential leak channels by a variety of coupling means such as, by way of example, not limitation, laser brazing, induction brazing, rectangular spot weld, and/or laser welding.

For example, as illustrated in FIG. 5, a first cross member 28a operably couples the first panel 16a to the second panel 16b in the second direction 94 that opposes the first direction 70 of the seam member 26. In the same example, a second cross member 28b operably couples the inner surface 18a of the first panel 16a to the outer surface 19b of the second panel 16b. The second cross member 28b is also disposed in the second direction 94 opposing the first direction 70 of the seam member 26. The second direction 94 may be described as being substantially perpendicular to the first direction 70 such that the first and second cross members 28a, 28b may perpendicularly intersect the seam member 26. Also, the first and second cross members 28a, 28b may be further described as being disposed laterally along the first and second panels 16a, 16b as opposed to the longitudinal placement of the seam member 26.

Because the first and second cross members 28a, 28b are perpendicular to, or disposed laterally relative, the first and second brims 90a, 90b, the first and second cross members 28a, 28b apply a sealing force 96 to edges 98 of the first and second brims 90a, 90b, respectively. The sealing force 96 seals the potential gaps that may be formed by the previously angled brims 90, which minimizes the potential leak channels that may form as a result of the gaps. The sealing of the first and second brims 90a, 90b helps to maintain the evacuated state of the vacuum insulated structure 40 (FIG. 1).

Referring now to FIG. 6, either a first side 110 or a second side 112 of the seam member 26 may define each of the first and second brims 90a, 90b. The cross member 28 is disposed across the edges 98 of the first and second brims 90a, 90b, such that the edges 98 become generally sloped. Additionally, the cross member 28 may also be encased by and coupled to the trim breaker 48 via the adhesive 50. The combination of the cross member 28 and the adhesive 50 may further seal the edge 98 and a contact surface 116 (FIG. 7) of each of the first and second brims 90a, 90b to such an extent that the potential leak channels are sealed.

The cross member 28 is illustrated as being positioned proximate a perimeter 118 of the panel assembly 14 in the second direction 94, perpendicular to the seam member 26. The seam member 26 is disposed in the first direction 70 along the length L (FIG. 4) of the second panel 16b, such that the first direction 70 may be defined as being substantially parallel along the length L of at least the second panel 16b. Moreover as illustrated across the seam member 26, the first portion 30 of the cross member 28 is relative the first side 110 of the seam member 26, and the second portion 32 of the cross member 28 is relative the second side 112 of the seam member 26. In addition, the intermediate portion 34 of the cross member 28 is substantially disposed on the seam member 26.

Figure 7:
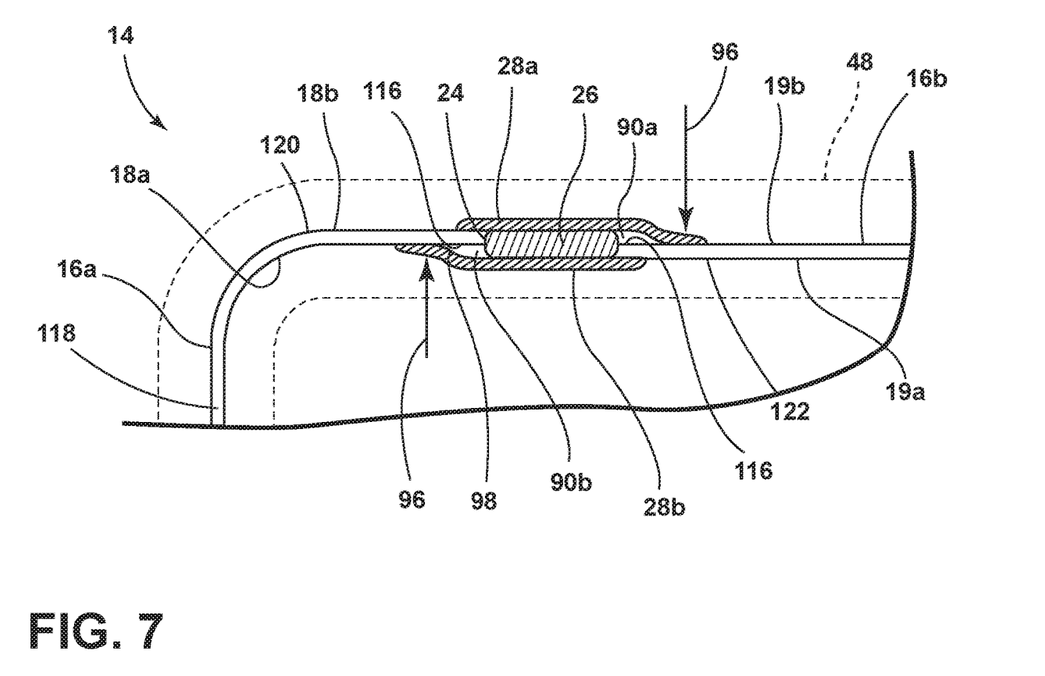
FIG. 7 is a cross-sectional view of a corner of a panel assembly of the present disclosure.

Referring now to FIG. 7, the first panel 16a overlaps the second panel 16b, and the seam member 26 operably couples the first panel 16a to the second panel 16b at the joint portion 24 to form the first and second brims 90a, 90b. In addition to the edge 98, each of the first and second brims 90a, 90b may include the contact surface 116. By way of example, not limitation, the contact surface 116 of the first brim 90a may be disposed on the outer surface 19b of the second panel 16b. In such an example, the contact surface 116 of the second brim 90b may be disposed on the inner surface 18a of the first panel 16a. Additionally, prior to disposing either of the first and/or second cross members 28a, 28b, the edges 98 may form a generally 90-degree angle relative the inner and outer surfaces 18a-19b of the first and second panels 16a, 16b and the contact surfaces 116 of each of the first and second brims 90a, 90b. Stated differently, prior to disposing the first and second cross members 28a, 28b the respective edges 98 of the first and second brims 90a, 90b are substantially perpendicular to the inner and outer surfaces 18a-19b of the first and second panels 16a, 16b and the contact surfaces 116 of the first and second brims 90a, 90b.

As mentioned above, the first and second cross members 28a, 28b may cover the edges 98 of each of the first and second brims 90a, 90b such that the edges 98 may be generally smooth. For example, as illustrated, the first and second cross members 28a, 28b are welded across the seam member 26 and the first and second brims 90a, 90b such that the edges 98 may be compressed. Thus, the edge 98 of the first brim 90a is coupled, via the first cross member 28a, to the outer surface 19b of the second panel 16b, and the edge 98 of the second brim 90b is coupled, via the second cross member 28b, to the inner surface 19a of the first panel 16a. Additionally, the first and second cross members 28a, 28b may be disposed along a first end portion 120 and a second end portion 122, respectively, of the first and second panels 16a, 16b. Generally, the first end portion 120 is defined in relation to the outer surfaces 18b, 19b of each of the first and second panels 16a, 16b, and the second end portion 122 is defined in relation to the inner surfaces 18a, 19a of each of the first and second panels 16a, 16b.

Figure 8:
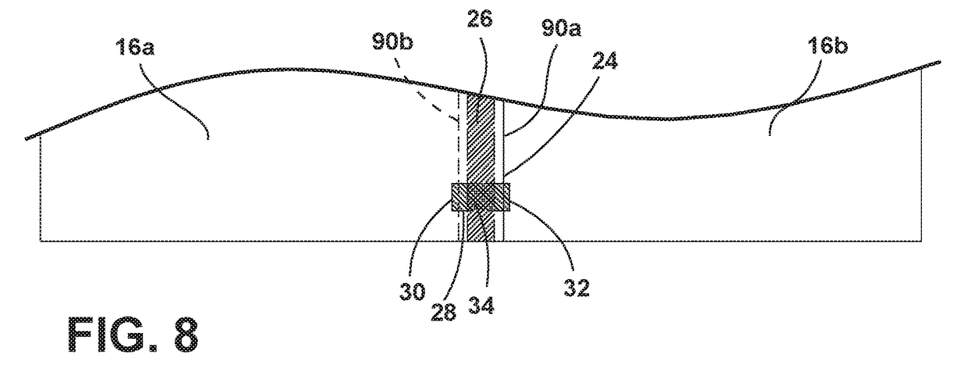
FIG. 8 is a partial top view of a corner of a panel assembly of the present disclosure.
Figure 9:
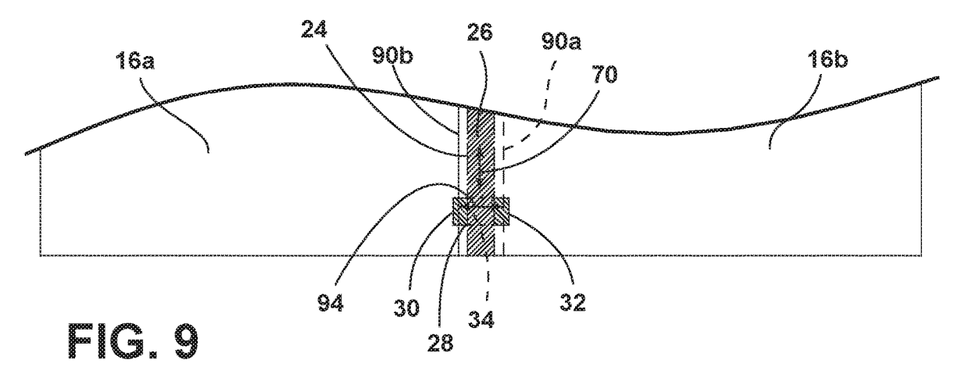
FIG. 9 is a partial top view of a corner of a panel assembly of the present disclosure.

Referring now to FIGS. 8 and 9, the intermediate portion 34 is defined between the first and second portions 30, 32 of the cross member 28. For example, as shown in FIG. 8, the intermediate portion 34 is disposed on the seam member 26. As further illustrated in FIG. 8, the first portion 30 of the cross member 28 is disposed on and coupled to the first panel 16a, and the second portion 32 of the cross member 28 is disposed on and coupled to both the first brim 90a and the second panel 16b. Accordingly, in such depiction, the seam member 26 couples the first panel 16a to the second panel 16b at the joint portion 24, and the cross member 28 interconnects the first and second panels 16a, 16b via at least the first and second portions 30, 32. Such interconnection may result from the cross member 28 coupling to, for example, the seam member 26 and the first brim 90a, as well as the first and second panels 16a, 16b. Alternatively, as depicted in FIG. 9, the first portion 30 of the cross member 28 is coupled to the second panel 16b and the second portion 32 may be coupled to the first panel 16a. In addition, as shown, the intermediate portion 34 couples to the joint portion 24 beneath the seam member 26. Thus in FIG. 9, the second brim 90b is coupled to the first panel 16a, which may ultimately further couple the first panel 16a to the second panel 16b by coupling to the joint portion 24 and the second brim 90b.

Figure 10:
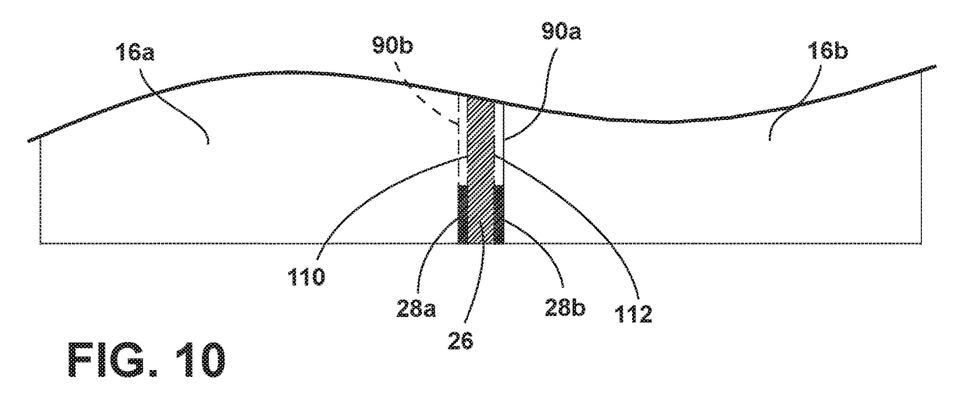
FIG. 10 is a partial top view of a corner of a panel assembly of the present disclosure.

Although the cross member 28 is illustrated as being generally perpendicular to the seam member 26, it is also contemplated that the cross member 28 may span a range of directions relative the seam member 26. By way of example, not limitation, the cross member 28 may be disposed in a diagonal direction relative to the seam member 26 such that the first and second portions 30, 32 of the cross member 28 may each be positioned in opposing second directions 94 relative to the first direction 70 of the seam member 26. The positioning of the cross member 28 may generally be any direction so long as the cross member 28 couples the first and second brims 90a, 90b to the second and first panels 16b, 16a. Additionally, it is generally contemplated that the construction of the cross member 28, as shown in FIGS. 8-10, relative the seam member 26 and the first and second panels 16a, 16b may occur on both the inner and outer surfaces 18a, 18b of the first panel 16a and both the inner and outer surfaces 19a, 19b of the second panel 16b. For example, as generally shown in FIG. 7, the first cross member 28a may couple to the outer surfaces 18b, 19b of the first and second panels 16a, 16b, and the second cross member 28b may couple to the inner surfaces 18a, 19a of the first and second panels 16a, 16b.

Referring now to FIG. 10, the first cross member 28a and the second cross member 28b may each be independently disposed along the seam member 26. For example, the first cross member 28a is illustrated on the first panel 16a along the first side 110 of the seam member 26, while the second cross member 28b is illustrated interconnecting the first brim 90a and the second panel 16b along the second side 112 of the seam member 26. As shown in FIG. 10, the first cross member 28a couples the first panel 16a to the second brim 90b, and the second cross member 28b couples the second panel 16b to the first brim 90a. Additionally illustrated in FIG. 10, the first and second cross members 28a, 28b do not intersect the seam member 26 but, rather, are disposed along the first and second sides 110, 112 of the seam member 26.

With reference again to FIGS. 1-11, having described various aspects of the panel assembly 14, a method 200 is disclosed for forming the panel assembly 14 for the appliance 10. According to the method 200, a first panel 16a including inner and outer surfaces 18a, 18b may be positioned proximate a second panel 16b including inner and outer surfaces 19a, 19b (step 202). The first and second panels 16a, 16b may be overlapped to define a joint portion 24 (step 204). The first panel 16a may be coupled to the second panel 16b using a seam member 26 (step 206). A plurality of cross members 28 may intersect the seam member 26 and may interconnect the first and second panels 16a, 16b (step 208). The cross members 28 may include first and second portions 30, 32 that may be positioned on the first and second panels 16a, 16b, respectively (step 210).

Figure 11:
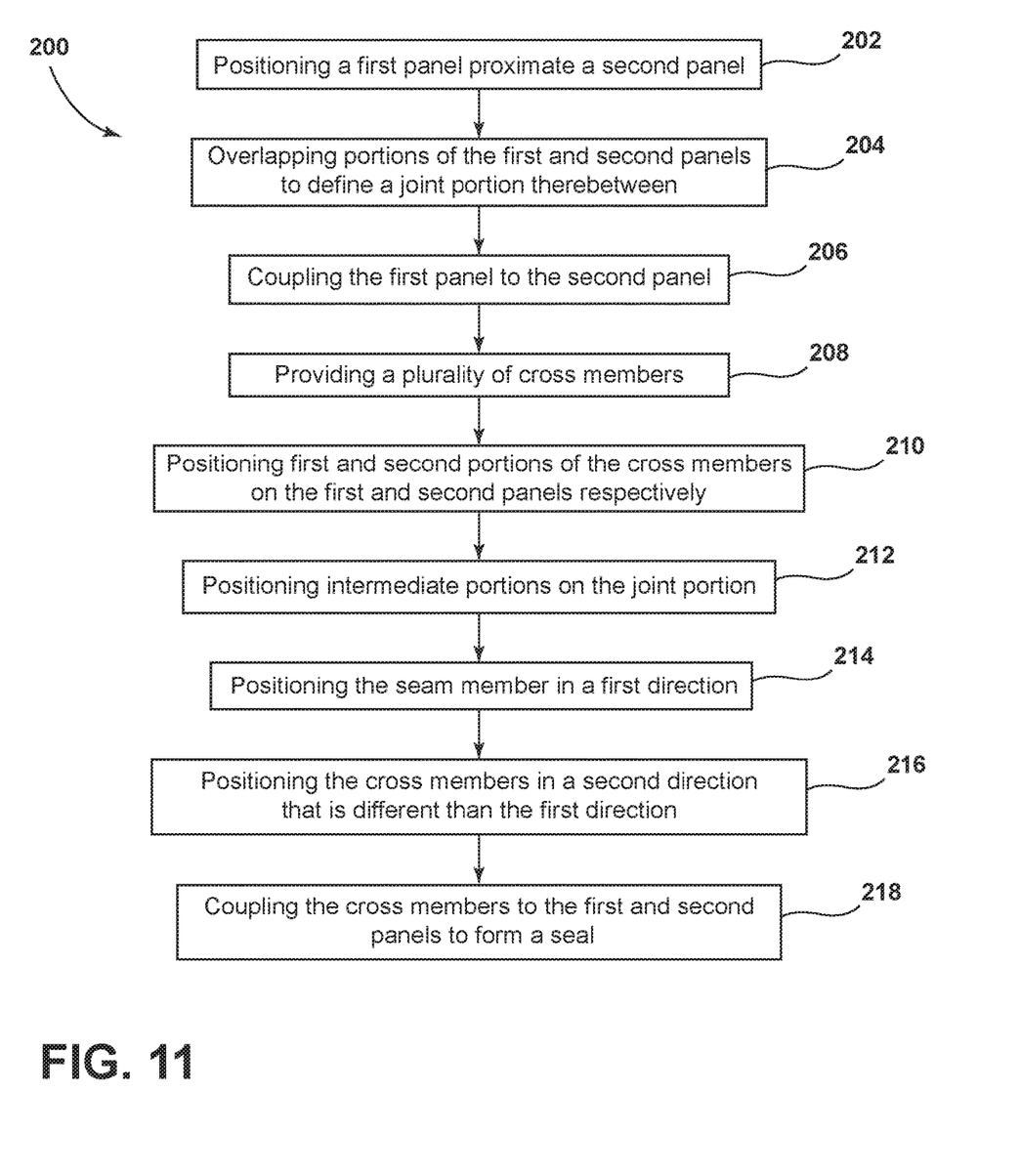
FIG. 11 is a flow diagram of a method of forming a panel assembly of the present disclosure.

Additionally, intermediate portions 34 of the cross members 28 may be positioned on the joint portion 24 (step 212). Alternatively, the intermediate portions 34 may be positioned on the seam member 26. The seam member 26 may be positioned at a first direction 70 along the joint portion 24 (step 214), and the cross members 28 may be positioned along the joint portion 24 in a second direction 94 that is different than the first direction 70 (step 216). The cross members 28 may be coupled to the first and second panels 16a, 16b to form a seal (step 218).

According to another aspect of the present disclosure, a panel assembly for a vacuum insulated structure includes a first panel having inner and outer surfaces and a second panel having inner and outer surfaces. The outer surface of a second panel is partially disposed on the inner surface of a first panel to define a joint portion therebetween. A seam member may operably couple a first panel to a second panel along a joint portion. At least one cross member may intersect a seam member and further operably couple a first panel to a second panel.

According to another aspect of the present disclosure, at least one cross member includes a first portion that is disposed on a first panel. A second portion is disposed on a second panel. An intermediate portion is positioned between a first portion and a second portion and is disposed on a seam member.

According to another aspect of the present disclosure, at least one cross member includes a first portion that is disposed on a first panel and also includes a second portion that is disposed on a second panel. An intermediate portion is positioned between a first portion and a second portion and is disposed on a joint portion of a first panel and a second panel.

According to another aspect of the present disclosure, at least one cross member includes a first cross member and a second cross member. The first cross member is disposed on the outer surfaces of a first panel and a second panel, and the second cross member is disposed on inner surfaces of the first and second panels.

According to another aspect of the present disclosure, a first cross member perpendicularly intersects a seam member. The seam member is disposed on the outer surfaces of a first panel and a second panel along a joint portion.

According to another aspect of the present disclosure, a second cross member perpendicularly intersects a seam member. The seam member is disposed on the inner surfaces of a first panel and a second panel along a joint portion.

According to another aspect of the present disclosure, a seam member is disposed along a joint portion in a first direction.

According to another aspect of the present disclosure, at least one cross member includes a first cross member and a second cross member. The first and second cross members operably couple a first panel to a second panel in a second direction that is different than the first direction.

According to another aspect of the present disclosure, a panel assembly for an appliance includes a first panel having inner and outer surfaces and a second panel having inner and outer surfaces. The inner surface of the second panel is partially disposed on the outer surface of the first panel to define a joint portion therebetween. A seam member operably couples the first panel to the second panel. A plurality of cross members includes a first portion that is disposed on the first panel. The plurality of cross members also includes a second portion that is disposed on the second panel and an intermediate portion that is positioned between the first and second portions.

According to another aspect of the present disclosure, an intermediate portion of a plurality of cross members is disposed on a seam member.

According to another aspect of the present disclosure, an intermediate portion of a plurality of cross members is disposed on a joint portion of a first panel and a second panel.

According to another aspect of the present disclosure, a first panel and a second panel include a first end portion and a second end portion, respectively.

According to another aspect of the present disclosure, a plurality of cross members include a first cross member and a second cross member. The first cross member is coupled to a first panel at a first end portion, and the second cross member is coupled to a second panel at a second end portion.

According to another aspect of the present disclosure, a seam member is positioned longitudinally along the inner surfaces of a first panel and a second panel.

According to another aspect of the present disclosure, a plurality of cross members are positioned along inner surfaces of a first panel and a second panel. The plurality of cross members perpendicularly intersect a seam member.

According to another aspect of the present disclosure, a seam member is positioned longitudinally along outer surfaces of a first panel and a second panel. The plurality of cross members perpendicularly intersect a seam member.

According to another aspect of the present disclosure, a method for forming a panel assembly for an appliance includes positioning a first panel having inner and outer surfaces proximate a second panel having inner and outer surfaces. The first and second panels overlap to define a joint portion therebetween. The first panel is coupled to the second panel using a seam member. A plurality of cross members intersect the seam member and interconnect a first and a second panel.

According to another aspect of the present disclosure, a seam member is positioned in a first direction along a joint portion. Each cross member of a plurality of cross members are positioned in a second direction that is different than the first direction.

According to another aspect of the present disclosure, wherein each cross member of a plurality of cross members is substantially perpendicular to a seam member.

According to another aspect of the present disclosure, first portions of each cross member of a plurality of cross members are positioned on a first panel, and second portions of the plurality of cross members are positioned on a second panel. An intermediate portion of each cross member of the plurality of cross members are positioned on a joint portion. The plurality of cross members are coupled to a first panel and a second panel to form a seal.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A panel assembly for a vacuum insulated structure, comprising:
    a first panel having inner and outer surfaces;
    a second panel having inner and outer surfaces, wherein the outer surface of the second panel is partially disposed on the inner surface of the first panel to define a joint portion therebetween;
    a seam member, wherein the seam member operably couples the first panel to the second panel along the joint portion; and
    at least one cross member intersecting the seam member, wherein the at least one cross member further operably couples the first panel to the second panel.

2. The panel assembly of claim 1, wherein the at least one cross member includes a first portion disposed on the first panel, a second portion disposed on the second panel, and an intermediate portion positioned between the first and second portions and disposed on the seam member.

3. The panel assembly of claim 1, wherein the at least one cross member includes a first portion disposed on the first panel, a second portion disposed on the second panel, and an intermediate portion positioned between the first and second portions and disposed on the joint portion of the first and second panels.

4. The panel assembly of claim 1, wherein the at least one cross member includes a first cross member and a second cross member, and further wherein the first cross member is disposed on the outer surfaces of the first and second panels and the second cross member is disposed on the inner surfaces of the first and second panels.

5. The panel assembly of claim 4, wherein the first cross member perpendicularly intersects the seam member, and further wherein the seam member is disposed on the outer surfaces of the first and second panels along the joint portion.

6. The panel assembly of claim 4, wherein the second cross member perpendicularly intersects the seam member, and further wherein the seam member is disposed on the inner surfaces of the first and second panels along the joint portion.

7. The panel assembly of claim 1, wherein the seam member is disposed along the joint portion in a first direction.

8. The panel assembly of claim 7, wherein the at least one cross member includes a first cross member and a second cross member, wherein the first and second cross members further operably couple the first panel to the second panel in a second direction that is different than the first direction.

9. A panel assembly for an appliance, comprising:
a first panel having inner and outer surfaces;
a second panel having inner and outer surfaces, wherein the inner surface of the second panel is partially disposed on the outer surface of the first panel to define a joint portion therebetween;
a seam member, wherein the seam member operably couples the first panel to the second panel; and
a plurality of cross members, wherein each cross member of the plurality of cross members includes a first portion disposed on the first panel, a second portion disposed on the second panel, and an intermediate portion positioned between the first and second portions.

10. The panel assembly of claim 9, wherein the intermediate portion of the plurality of cross members is disposed on the seam member.

11. The panel assembly of claim 10, wherein the intermediate portion of the plurality of cross members is disposed on the joint portion of the first and second panels.

12. The panel assembly of claim 9, wherein the first panel and the second panel further include a first end portion and a second end portion, respectively.

13. The panel assembly of claim 12, wherein the plurality of cross members include a first cross member and a second cross member, and further wherein the first cross member is coupled to the first panel at the first end portion and the second cross member is coupled to the second panel at the second end portion.

14. The panel assembly of claim 9, wherein the seam member is positioned longitudinally along the inner surfaces of the first and second panels.

15. The panel assembly of claim 14, wherein the plurality of cross members are positioned laterally along the inner surfaces of the first and second panels, and further wherein the plurality of cross members perpendicularly intersect the seam member.

16. The panel assembly of claim 9, wherein the seam member is positioned longitudinally along the outer surfaces of the first and second panels, and further wherein the plurality of cross members perpendicularly intersect the seam member.

17. A method for forming a panel assembly for an appliance, the method comprising the steps of:
positioning a first panel including inner and outer surfaces proximate a second panel including inner and outer surfaces;
overlapping the first and second panels to define a joint portion therebetween;
coupling the first panel to the second panel using a seam member; and
providing a plurality of cross members intersecting the seam member, and interconnecting the first and second panels.

18. The method of claim 17, further comprising the steps of:
positioning the seam member along the joint portion in a first direction; and
positioning each cross member of the plurality of cross members along the joint portion in a second direction that is different than the first direction.

19. The method of claim 18, wherein each cross member of the plurality of cross members is substantially perpendicular to the seam member.

20. The method of claim 17, further comprising the steps of:
positioning first portions of each cross member of the plurality of cross members on the first panel;
positioning second portions of each cross member of the plurality of cross members on the second panel;
positioning intermediate portions of each cross member of the plurality of cross members on the joint portion; and
coupling the plurality of cross members to the first and second panels to form a seal.

* * * * *